US012219207B2

(12) United States Patent
Xie

(10) Patent No.: US 12,219,207 B2
(45) Date of Patent: Feb. 4, 2025

(54) VIDEO SPLICING METHOD AND APPARATUS, AND COMPUTER DEVICE AND STORAGE MEDIUM

(71) Applicant: ARASHI VISION INC., Shenzhen (CN)

(72) Inventor: Chaoyi Xie, Shenzhen (CN)

(73) Assignee: ARASHI VISION INC., Shenzhen (CN)

( * ) Notice: Subject to any disclaimer, the term of this patent is extended or adjusted under 35 U.S.C. 154(b) by 0 days.

(21) Appl. No.: 18/278,651

(22) PCT Filed: Feb. 24, 2022

(86) PCT No.: PCT/CN2022/077635
§ 371 (c)(1),
(2) Date: Nov. 27, 2023

(87) PCT Pub. No.: WO2022/179554
PCT Pub. Date: Sep. 1, 2022

(65) Prior Publication Data
US 2024/0267588 A1 Aug. 8, 2024

(30) Foreign Application Priority Data
Feb. 26, 2021 (CN) .......................... 202110217098.6

(51) Int. Cl.
*H04N 21/44* (2011.01)
*H04N 21/431* (2011.01)

(52) U.S. Cl.
CPC ... *H04N 21/44016* (2013.01); *H04N 21/4316* (2013.01); *H04N 21/44008* (2013.01)

(58) Field of Classification Search
None
See application file for complete search history.

(56) References Cited

U.S. PATENT DOCUMENTS 10,582,127 B2 3/2020 Oryoji et al.
2016/0286138 A1 9/2016 Kim
2018/0341813 A1* 11/2018 Chen ..................... G06V 20/46

FOREIGN PATENT DOCUMENTS

CN 101304490 A 11/2008
CN 101668130 A 3/2010
CN 111294644 B 6/2021

* cited by examiner

*Primary Examiner* — Samira Monshi
(74) *Attorney, Agent, or Firm* — XSENSUS LLP

(57) ABSTRACT

A video splicing method includes: acquiring a first video and a second video, which are to be spliced, wherein the first video is before the second video; performing freeze frame detection on the first video or the second video, so as to obtain a freeze frame sequence; obtaining a reference video frame on the basis of the freeze frame sequence; searching for an overlapping area on the basis of the reference video frame, so as to obtain a first overlapping video frame area corresponding to the first video and a second overlapping video frame area corresponding to the second video; and on the basis of the first overlapping video frame area and the second overlapping video frame area, splicing the first video and the second video to obtain a spliced video. By means of the method, the video splicing effect can be improved.

15 Claims, 5 Drawing Sheets

VIDEO SPLICING METHOD AND APPARATUS, AND COMPUTER DEVICE AND STORAGE MEDIUM

TECHNICAL FIELD OF THE INVENTION

The present application relates to the technical field of image processing, and in particular, relates to a video splicing method and apparatus, a computer device and a storage medium.

BACKGROUND OF THE INVENTION

With the development of image processing technology, video splicing technology emerges, and videos shot at different time conditions can be spliced together to form a complete video through the video splicing technology. For example, a camera shoots a panoramic video where an object passes through an obstacle. When an object is photographed passing through an obstacle, the shooting of the first video is stopped after the object passes through the obstacle for a certain distance. Then, the camera bypasses the obstacle and shoots the second video of the object passing through the obstacle from the other side of the obstacle, and then the first video and the second video are spliced to form a complete panoramic video of the object passing through the obstacle. Panoramic videos are widely used in various fields due to large viewing angle and high resolution thereof, and thus video splicing technology is also widely used in various fields.

However, the video splicing method currently available has the problem of poor video splicing effect.

SUMMARY OF THE INVENTION

A video splicing method is provided which includes: acquiring a first video and a second video which are to be spliced, wherein the first video is before the second video; performing frame freeze detection on the first video or the second video so as to obtain a freeze frame sequence; obtaining a reference video frame on the basis of the freeze frame sequence; searching for an overlapping area on the basis of the reference video frame so as to obtain a first overlapping video frame area of the first video and a second overlapping video frame area of the second video; splicing the first video and the second video on the basis of the first overlapping video frame area and the second overlapping video frame area to obtain a spliced video.

In one embodiment, the operation of splicing the first video and the second video on the basis of the first overlapping video frame area and the second overlapping video frame area to obtain a spliced video includes: acquiring a position of the spliced video frame, acquiring a first spliced video frame corresponding to the position of the spliced video frame from the first overlapping video frame area, and acquiring a second spliced video frame corresponding to the position of the spliced video frame from the second overlapping video frame area; determining a spatial transformation relationship between the first spliced video frame and the second spliced video frame, and performing video frame alignment on the first video and the second video based on the spatial transformation relationship; performing video frame splicing based on the aligned first video frame and second video frame to obtain a spliced video, wherein during splicing, the first overlapping video frame area and the second overlapping video frame area are fused to obtain a fused video frame.

In one embodiment, the spatial transformation relationship includes a horizontal transformation value, and the operation of determining a spatial transformation relationship between the first spliced video frame and the second spliced video frame and performing video frame alignment on the first video and the second video based on the spatial transformation relationship includes: acquiring a first feature point of the first spliced video frame and a second feature point of the second spliced video frame; determining a horizontal distance between the first feature point and the second feature point; determining a horizontal transformation value between the first spliced video frame and the second spliced video frame based on the horizontal distance.

In one embodiment, the step of fusing the first overlapping video frame area and the second overlapping video frame area to obtain a fused video frame includes: acquiring a current video frame to be fused from the first overlapping video frame area; acquiring a current time difference between a current shooting time of the current video frame and a reference shooting time of the reference video frame; obtaining a current fusion weight corresponding to the current video frame based on the current time difference, wherein the current time difference has a positive correlation with the current fusion weight; fusing the current video frame with a video frame at the corresponding position of the second overlapping video frame area based on the current fusion weight to obtain a current fused video frame.

In one embodiment, the operation of obtaining a current fusion weight corresponding to the current video frame based on the current time difference includes: acquiring a time length of the overlapping video frame area; calculating a ratio of the current time difference to the time length of the overlapping video frame area to obtain the current fusion weight.

In one embodiment, the operation of searching for an overlapping area on the basis of the reference video frame so as to obtain a first overlapping video frame area of the first video and a second overlapping video frame area of the second video includes: comparing the reference video frame with respective video frames in the first video respectively to obtain a matched video frame in the first video that matches the reference video frame; taking a tail video frame area of the matched video frame as the first overlapping video frame area of the first video; taking a reference video frame area where the reference video frame is located in the second video frame as the second overlapping video frame area of the second video, wherein the reference video frame is a head video frame of the reference video frame area, and the number of video frames in the reference video frame area matches that in the tail video frame area.

In one embodiment, the operation of searching for an overlapping area on the basis of the reference video frame so as to obtain a first overlapping video frame area of the first video and a second overlapping video frame area of the second video includes: acquiring a tail video frame sequence with a preset number of frames in the first video to serve as the first overlapping video frame area of the first video; acquiring a matched video frame sequence matched with the tail video frame sequence from a backward video frame sequence corresponding to the reference video frame, and taking the matched video frame sequence as the second overlapping video frame area of the second video.

In one embodiment, the operation of performing frame freeze detection on the first video or the second video so as to obtain a freeze frame sequence includes: converting the first video or the second video into a plane video; performing frame freeze detection on the plane video so as to obtain the freeze frame sequence.

A video splicing apparatus is provided which includes: a first video and second video acquisition module, being configured to acquire a first video and a second video which are to be spliced, wherein the first video is before the second video; a freeze frame sequence obtaining module, being configured to perform frame freeze detection on the first video or the second video so as to obtain a freeze frame sequence; a reference video frame obtaining module, being configured to obtain a reference video frame on the basis of the freeze frame sequence; a first overlapping video frame area and second overlapping video frame area obtaining module, being configured to search for an overlapping area on the basis of the reference video frame so as to obtain a first overlapping video frame area of the first video and a second overlapping video frame area of the second video; a spliced video obtaining module, being configured to splice the first video and the second video on the basis of the first overlapping video frame area and the second overlapping video frame area to obtain a spliced video.

In one embodiment, the spliced video obtaining module is configured to acquire a position of the spliced video frame, acquire a first spliced video frame corresponding to the position of the spliced video frame from the first overlapping video frame area, and acquire a second spliced video frame corresponding to the position of the spliced video frame from the second overlapping video frame area; determine a spatial transformation relationship between the first spliced video frame and the second spliced video frame, and perform video frame alignment on the first video and the second video based on the spatial transformation relationship; perform video frame splicing based on the aligned first video frame and second video frame to obtain a spliced video, wherein during splicing, the first overlapping video frame area and the second overlapping video frame area are fused to obtain a fused video frame.

In one embodiment, the spliced video obtaining module is configured to: acquire a first feature point of the first spliced video frame and a second feature point of the second spliced video frame; determine a horizontal distance between the first feature point and the second feature point; determine a horizontal transformation value between the first spliced video frame and the second spliced video frame based on the horizontal distance.

In one embodiment, the spliced video obtaining module is configured to: acquire a current video frame to be fused from the first overlapping video frame area; acquire a current time difference between a current shooting time of the current video frame and a reference shooting time of the reference video frame; obtain a current fusion weight corresponding to the current video frame based on the current time difference, wherein the current time difference has a positive correlation with the current fusion weight; fuse the current video frame with a video frame at the corresponding position of the second overlapping video frame area based on the current fusion weight to obtain a current fused video frame.

In one embodiment, the spliced video obtaining module is configured to: acquire a time length of the overlapping video frame area; calculate a ratio of the current time difference to the time length of the overlapping video frame area to obtain the current fusion weight.

In one embodiment, the first overlapping video frame area and second overlapping video frame area obtaining module is configured to: compare the reference video frame with respective video frames in the first video respectively to obtain a matched video frame in the first video that matches the reference video frame; take a tail video frame area of the matched video frame as the first overlapping video frame area of the first video; take a reference video frame area where the reference video frame is located in the second video frame as the second overlapping video frame area of the second video, wherein the reference video frame is a head video frame of the reference video frame area, and the number of video frames in the reference video frame area matches that in the tail video frame area.

In one embodiment, the first overlapping video frame area and second overlapping video frame area obtaining module is configured to: acquire a tail video frame sequence with a preset number of frames in the first video to serve as the first overlapping video frame area of the first video; acquire a matched video frame sequence matched with the tail video frame sequence from a backward video frame sequence corresponding to the reference video frame, and take the matched video frame sequence as the second overlapping video frame area of the second video.

In one embodiment, the freeze frame sequence obtaining module is configured to: convert the first video or the second video into a plane video; perform frame freeze detection on the plane video so as to obtain the freeze frame sequence.

A computer device is provided which includes a memory and a processor, the memory stores a computer program, and the processor implements the following steps when executing the computer program: acquiring a first video and a second video which are to be spliced, wherein the first video is before the second video; performing frame freeze detection on the first video or the second video so as to obtain a freeze frame sequence; obtaining a reference video frame on the basis of the freeze frame sequence; searching for an overlapping area on the basis of the reference video frame so as to obtain a first overlapping video frame area of the first video and a second overlapping video frame area of the second video; splicing the first video and the second video on the basis of the first overlapping video frame area and the second overlapping video frame area to obtain a spliced video.

A computer-readable non-volatile storage medium is provided which stores a computer program thereon, the computer program, when executed by a processor, implements the following steps: acquiring a first video and a second video which are to be spliced, wherein the first video is before the second video; performing frame freeze detection on the first video or the second video so as to obtain a freeze frame sequence; obtaining a reference video frame on the basis of the freeze frame sequence; searching for an overlapping area on the basis of the reference video frame so as to obtain a first overlapping video frame area of the first video and a second overlapping video frame area of the second video; splicing the first video and the second video on the basis of the first overlapping video frame area and the second overlapping video frame area to obtain a spliced video.

DETAILED DESCRIPTION OF THE INVENTION

In order to make the purpose, technical solutions and advantages of the present application more clear, the present application will be further described in detail hereinafter with reference to the attached drawings and embodiments. It shall be appreciated that, the specific embodiments described herein are only used to explain the present application and are not used to limit the present application.

Figure 1:
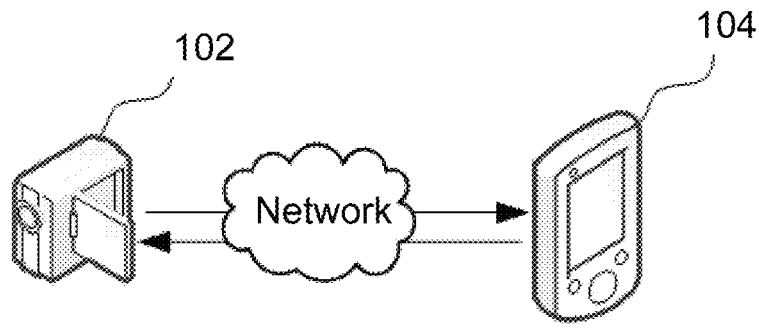
FIG. 1 is an application environment diagram of a video splicing method in one embodiment.

The video splicing method provided according to the present application may be applied to the application environment as shown in FIG. 1, and in particular, applied to a video splicing system. The video splicing system includes a video capture device 102 and a terminal 104, wherein the video capture device 102 communicates with the terminal 104 through a network. The terminal 104 executes a video splicing method. Specifically, the video capture device 102 transmits two videos to be spliced, which are shot at the same position of the object to be photographed at different times, to the terminal 104, and the terminal 104 correspondingly acquires the first video and the second video to be spliced, wherein the first video is the forward video of the second video; after acquiring the first video and the second video, the terminal 104 performs frame freeze detection on the first video or the second video to obtain a freeze frame sequence; obtains a reference video frame based on a freeze frame sequence; and searches for an overlapping area on the basis of the reference video frame to respectively obtain a first overlapping video frame area in the first video and a second overlapping video frame area in the second video; the terminal 104 splices the first video and the second video on the basis of the first overlapping video frame area and the second overlapping video frame area to obtain a spliced video. The video capture device 102 may be, but not limited to, various devices with the video capturing function, and it may be distributed outside the terminal 104 or inside the terminal 104. For example, the video capture device 102 may be various webcams, cameras and video capture cards or the like distributed outside the terminal 104. The terminal 104 may be, but not limited to, various cameras, personal computers, notebook computers, smart phones, tablet computers and portable wearable devices.

Figure 2:
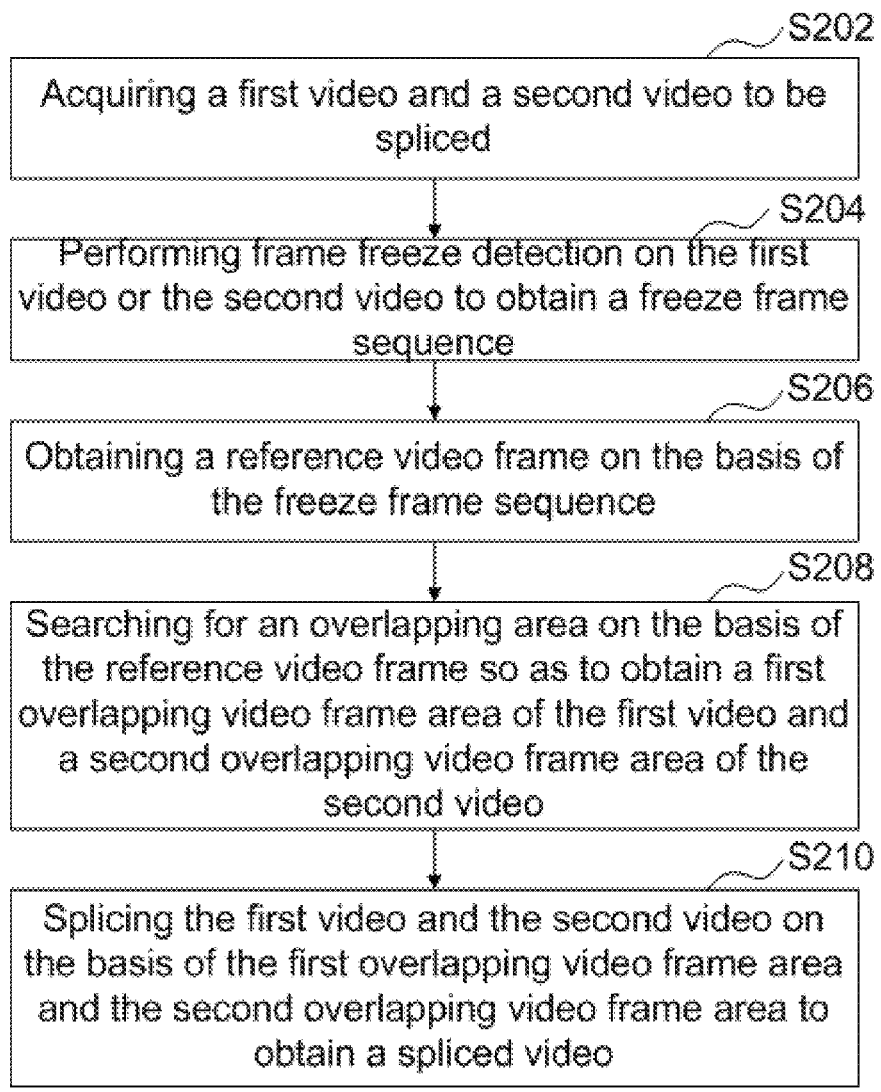
FIG. 2 is a schematic flowchart diagram of a video splicing method in one embodiment.

In one embodiment, as shown in FIG. 2, a video splicing method is provided. Taking the application of the method to the terminal in FIG. 1 as an example, the video splicing method includes the following steps:

Step 202: acquiring a first video and a second video which are to be spliced, wherein the first video is before the second video.

The forward video refers to the video with the same shooting position as the second video which is obtained before shooting the second video. For example, a camera shoots a panoramic video where an object passes through an obstacle. When an object is photographed passing through an obstacle, the shooting of the first video is stopped after the object passes through the obstacle for a certain distance. Then, the camera bypasses the obstacle and shoots the second video of the object passing through the obstacle from the other side of the obstacle. The time of shooting the first video is regarded as the first time, and the time of shooting the second video is regarded as the second time. The first time is before the second time. Meanwhile, the two videos have the same shooting position, i.e., a position at a certain distance from the obstacle, so the first video is the forward video of the second video.

Specifically, when two videos are shot at different times and having the same position need to be spliced, the first video and the second video need to be acquired first.

In one embodiment, a terminal may collect videos through a video capture device connected thereto, and the capture device transmits the videos captured to the terminal in real time; or the capture device temporarily stores the captured videos in the local area of the capture device, and transmits the videos locally stored to the terminal when a video acquisition instruction of the terminal is received, and correspondingly, the terminal can acquire the first video and the second video to be spliced.

In one embodiment, the terminal captures the first video and the second video through a video capture module built therein, stores the captured videos in a memory of the terminal, and acquires the first video and the second video to be spliced from the memory when the terminal needs to splice the first video and the second video.

Step 204: performing frame freeze detection on the first video or the second video to obtain a freeze frame sequence.

A freeze frame refers to a video frame that makes the first video or the second video freeze among the respective video frames in the first video or the second video. A freeze frame sequence refers to a sequence consisting of freeze frames following a sequential order in the first video or the second video.

Specifically, when a freeze frame exists in a video, the video will appear unsmooth, and in order not to be affected by the freeze frame in the video splicing process, it is necessary to perform frame freeze detection on the first video or the second video.

In one embodiment, feature points may be extracted and matched between the last video frame in the first video and a plurality of consecutive video frames before the last video frame in sequence. When the matching results of the feature points of the plurality of consecutive video frames before the last video frame all meet the threshold condition, the video frame sequence consisting of the plurality of video frames is determined as a freeze frame sequence. For example, the last video frame in the first video is indicated as the first frame, and the feature points are extracted and matched between the last video frame and the consecutive n-2 frames before the last video frame; and when the matching results all meet the threshold condition, the video frame sequence consisting of the last n-1 frames in the first video is determined as a freeze frame sequence.

In one embodiment, feature points may be extracted and matched between the first video frame in the second video and a plurality of consecutive video frames after the first video frame in sequence. When the matching results of the feature points of the plurality of consecutive video frames after the first video frame all meet the threshold condition, the video frame sequence consisting of the plurality of video frames is determined as a freeze frame sequence. For example, the first video frame in the second video is indicated as the first frame, and the feature points are extracted and matched between the first video frame and the consecutive n-2 frames after the first video frame; and when the matching results all meet the threshold condition, the video frame sequence consisting of the first n-1 frames in the second video is determined as a freeze frame sequence.

In one embodiment, when feature point extraction and feature point matching of the video frames are performed, the image corresponding to the video frame is first converted into a plane view image. The plane view image may refer to a plane graph with a view angle of 90 degrees seen in a certain direction of the panorama; for example, the panorama includes six planes, namely, up, down, front, back, left and right planes, and each of the planes is a plane view. For example, the plane view includes a top view, a bottom view, a left view, a right view, an upward view and a downward view. During frame freeze detection performed on the first video, when the position of the feature points matched between the last video frame in the first video and a certain video frame among the to-be-determined freeze frames before the last video frame is between $1/10$ and $1/60$ of the image width in the aforesaid plane view, and the total number of feature points matched is more than 10% of the total number of feature points matched between the last video frame and the penultimate video frame in the first video, the video frame among the to-be-determined freeze frame is determined as a freeze frame. During frame freeze detection performed on the second video, when the position of the feature points matched between the first video frame in the second video and a certain video frame among the to-be-determined freeze frame after the first video frame is between $1/10$ and $1/60$ of the image width in the aforesaid plane view, and the total number of feature points matched is more than 10% of the total number of feature points matched between the first video frame and the second video frame in the second video, the video frame among the to-be-determined freeze frame is determined as a freeze frame.

In one embodiment, the Oriented Fast and Rotating Brief (ORB) feature point detection method may be adopted to extract and match feature points in video frames. As shall be appreciated, other feature point detection methods may also be adopted to extract and match feature points in video frames. For example, Scale-invariant feature transform (SIFT), Speeded Up Robust Features (SUFT), Line Segment Detection (LSD) or the like may be adopted.

Step 206: obtaining a reference video frame on the basis of the freeze frame sequence.

The reference video frame refers to a video frame that may be used as a reference, and the matching results of other video frames with this video frame can be obtained by using this video frame.

Specifically, after obtaining the freeze frame sequence, a forward video frame of the freeze frame sequence may be acquired in the first video or a backward video frame of the freeze frame sequence may be acquired in the second video, the forward video frame or the backward video frame is regarded as a non-freeze video frame which may be used as a reference video frame. The forward video frame refers to the first video frame before the freeze frame sequence in the first video, and the backward video frame refers to the first video frame after the freeze frame sequence in the second video. In one embodiment, the OpenCV software library in the terminal is called to extract the forward video frame or the backward video frame. OpenCV is a cross-platform computer vision and machine learning software library based on BSD (original BSD license, FreeBSD license, Original BSD license) which can extract video frames.

In one embodiment, frame freeze detection may be performed on the first video or the second video by Cyclic Redundancy Check (CRC) method, the CRC check value of each frame is obtained by creating multi-threads to perform CRC check on the video frames in the first video or the second video, the freeze frame in the first video or the second video may be obtained by the CRC check value, the non-freeze video frame is obtained based on the freeze frame, and the non-freeze video frame is used as a reference video frame. As shall be appreciated, other frame freeze detection methods may also be adopted to determine the freeze frame.

Step 208: searching for an overlapping area on the basis of the reference video frame so as to obtain a first overlapping video frame area of the first video and a second overlapping video frame area of the second video.

The overlapping area refers to the video frame area obtained by shooting the same position in two videos, for example in two videos shot at different times with the same shooting position, and the video frame area obtained by shooting the common shooting position of the two videos is the overlapping area.

Specifically, after the reference video frame is acquired, the overlapping area can be determined by the reference video frame.

In one embodiment, the reference video frame may be matched with all the frames in the first video, and in the first video, the video frame with the highest matching probability is taken as the start frame of the first overlapping video frame area. Accordingly, in the second video, the second overlapping video frame area of the second video is obtained by using the area corresponding to the video frame with the same position as the video frame in the first overlapping video frame area. For example, the start frame is indicated as a frame P, and in the first video, the video frame part corresponding to all the video frames after the frame P is taken as the overlapping area. In the second video, the video frame area with the same position as all the video frames after the frame P is the video frame area between a frame C and a frame F, then the video frame area between the frame C and the frame F is used as the second overlapping video frame area.

In one embodiment, a preset number of video frames after the reference video frame may be taken for matching of corresponding video frames. For example, m frames after the reference video frame may be taken and compared with the last m frames in the first video to obtain m frames corresponding to the maximum statistical value of the matching number of feature points to serve as the first overlapping video frame area. When m takes different values, the obtained statistical values of the matching number of feature points are different, and a table of correspondence between m frames and the statistical values of the matching number of feature points is formed, the maximum value of the statistical value of the matching number is found from the table, and the m frames corresponding to the maximum value of the statistical value is the obtained video frame number of the overlapping area. Accordingly, a second overlapping video frame area of the second video can be obtained. A table of correspondence between the preset number of frames and the statistical value of the matching number of feature points is as shown in Table 1 below.

TABLE 1

Table of Correspondence between Value of m and Statistical Value of Matching Number of Feature Points

| Value of m (preset number of frames) | Statistical value of matching number of feature points |
|---|---|
| 20 | 1000 |
| 30 | 1200 |
| 35 | 900 |
| 40 | 1100 |

As can be found from Table 1, when the value of m is 30, the corresponding statistical value of the matching number of feature points is the largest, and then the last 30 frames in the first video are taken as the first overlapping video frame area.

Step 210: splicing the first video and the second video on the basis of the first overlapping video frame area and the second overlapping video frame area to obtain a spliced video.

Splicing refers to the process of combining two or more videos into a complete video.

Specifically, after determining the first overlapping video frame area and the second overlapping video frame area, the first video and the second video are processed in the first overlapping video frame area and the second overlapping video frame area so as to obtain a spliced video.

In one embodiment, after the first video and the second video are aligned in the first overlapping video frame area and the second overlapping video frame area, an image fusion is performed on the first video and the second video to obtain a complete panoramic video. The method for Image fusion may be linear fusion, Poisson fusion, multi-scale fusion, weighted fusion or Laplacian pyramid fusion or the like. As shall be appreciated, each frame of a video may be regarded as a freeze image, and when video fusion is carried out, fusion of a plurality of aligned video frames in the overlapping video frame area may be regarded as the fusion of a plurality of static images.

In one embodiment, a complete panoramic video is obtained by the method of weighted fusion of the first video and the second video.

In one embodiment, in the process of weighted fusion of the first video and the second video, the weight may be determined by the current time difference between the current shooting time of the current video frame in the overlapping area and the reference shooting time of the reference video frame. If Q represents the weight, t1 represents the current shooting time of the current video frame, t2 represents the reference shooting time of the reference video frame, and t represents the total time corresponding to the video frames in the overlapping area, then the weight may be calculated by the difference between the current shooting time of the current video frame and the reference shooting time of the reference video frame as well as the total time corresponding to the video frames in the overlapping area. The weight Q may be expressed by the formula: $Q=(t1-t2)/t$, and image fusion is performed by using the weight and the video frames in the first overlapping video frame area of the first video and the video frames in the second overlapping video frame area of the second video so as to obtain the fused spliced video. If I represents the fused video frame, I1 represents the current video frame of the first video in the overlapping area, and I2 represents the current video frame of the second video in the overlapping area, then the fused video frame I may be expressed by the formula: $I=I1\times Q+I2\times(1-Q)$. As shall be appreciated, the first overlapping video frame area and the second overlapping video frame area are respectively areas of the overlapping video frame areas in the first video and the second video, and the areas are the overlapping areas of the first video and the second video, and the first overlapping video frame area and the second overlapping video frame area are used to distinguish whether the overlapping area presents in the overlapping video frame areas corresponding to the first video or the second video.

In the video splicing method described above, a terminal acquires a first video and a second video which are to be spliced, and performs frame freeze detection on the first video or the second video to obtain a freeze frame sequence; and obtains a reference video frame based on the freeze frame sequence; wherein the first video is shot before the second video is shot. Overlapping area searching is performed on the basis of the reference video frame so as to obtain a first overlapping video frame area of the first video and a second overlapping video frame area of the second video; the first video and the second video are spliced on the basis of the first overlapping video frame area and the second overlapping video frame area to obtain a spliced video. By determining the reference video frame to obtain the first overlapping video frame area and the second overlapping video frame area and splicing the first video and the second video based on the two overlapping video frame areas described above, natural splicing transition can be realized for the first video and the second video, thereby improving the video splicing effect.

Figure 3:
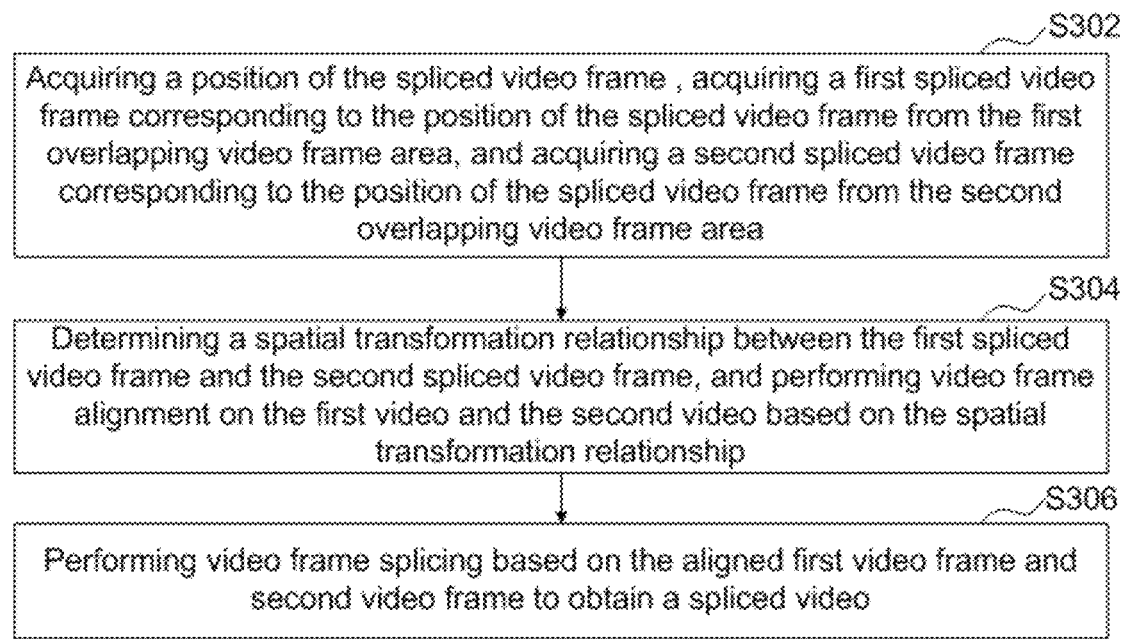
FIG. 3 is a schematic flowchart diagram of a video splicing method in another embodiment.

In one embodiment, as shown in FIG. 3, the operation of splicing the first video and the second video on the basis of the first overlapping video frame area and the second overlapping video frame area to obtain a spliced video includes:

Step 302: acquiring a position of the spliced video frame, then acquiring a first spliced video frame corresponding to the position of the spliced video frame from the first overlapping video frame area, and acquiring a second spliced video frame corresponding to the position of the spliced video frame from the second overlapping video frame area.

The position of the spliced video frame refers to the video frame position where the first video and the second video can be spliced together. For example, in the overlapping video frame area, for videos shot at different times, the spatial position shot at the 100th frame in the first video is at a frame S, and the position shot at the 10th frame in the second video is also at the frame S, then the spliced position is the frame S; correspondingly, the position of the image at the 100th frame in the first video and the image at the 10th frame in the second video may be considered as the position of the spliced video frame.

Specifically, during the splicing of the first video and the second video, splicing may be performed by acquiring the position of the spliced video frame of the two videos.

In one embodiment, the central video frame in the overlapping area may be selected as the position of the spliced video frame, and after the position of the spliced video frame is obtained, the first spliced video frame corresponding to the position of the spliced video frame in the first video and the second spliced video frame corresponding to the position of the spliced video frame in the second video may be determined. The central video frame is a video frame located in the middle of a video frame sequence. For example, if five video frames are arranged in the video frame sequence, and the video frame positions are {1, 2, 3, 4, 5} respectively, then the video frame at position 3 is the video frame in the middle of the video frame sequence.

In one embodiment, when the video frames in the overlapping area are aligned between the first overlapping video frame area and the second overlapping video frame area, the number of matching points between the aligned video frames may be optionally calculated for the aligned video frames, the video frame with the largest number of matching points is used as the position of the spliced video frame, and after the position of the spliced video frame is obtained, the first spliced video frame corresponding to the position of the spliced video frame in the first video and the second spliced video frame corresponding to the position of the spliced video frame in the second video can be determined.

Step 304: determining a spatial transformation relationship between the first spliced video frame and the second spliced video frame, and performing video frame alignment on the first video and the second video based on the spatial transformation relationship.

The spatial transformation relationship refers to the transformation relationship such as rotation, translation, zooming in and zooming out or the like between the first spliced video frame and the second spliced video frame.

Specifically, there may be a certain angle between the first spliced video and the second spliced video due to shooting angle and other reasons. Correspondingly, there will also be a certain angle between the first spliced video frame and the second spliced video frame, and in order to complete the splicing of the first spliced video frame and the second spliced video frame, it is necessary to determine the spatial transformation relationship between the first spliced video frame and the second spliced video frame, and the first spliced video frame and the second spliced video frame can be spliced together only after video frame alignment is performed on the first video and the second video based on the spatial transformation relationship.

In one embodiment, by deriving the homography transformation matrix between two images, the images shot from different angles are all converted to the same view angle, the spatial transformation relationship from video frame to video frame is obtained, and video frame alignment is performed on the first video and the second video based on the spatial transformation relationship.

Step 306: performing video frame splicing based on the aligned first video frame and second video frame to obtain a spliced video, wherein during splicing, the first overlapping video frame area and the second overlapping video frame area are fused to obtain a fused video frame.

The fused video frame refers to the video frame corresponding to the high-quality image information synthesized by extracting corresponding information capable of enhancing the image quantity in the first video frame and the second video frame.

In this embodiment, by acquiring the position of the spliced video frame, determining the spatial transformation relationship between the corresponding first spliced video frame and the second spliced video frame at the position of the spliced video frame, and fusing the first video and the second video to obtain a fused video frame after video frame alignment is performed on the first video and the second video, the first video and the second video can be accurately spliced, and the spliced first video and the second video can realize natural transition, thereby improving the splicing effect.

Figure 4:
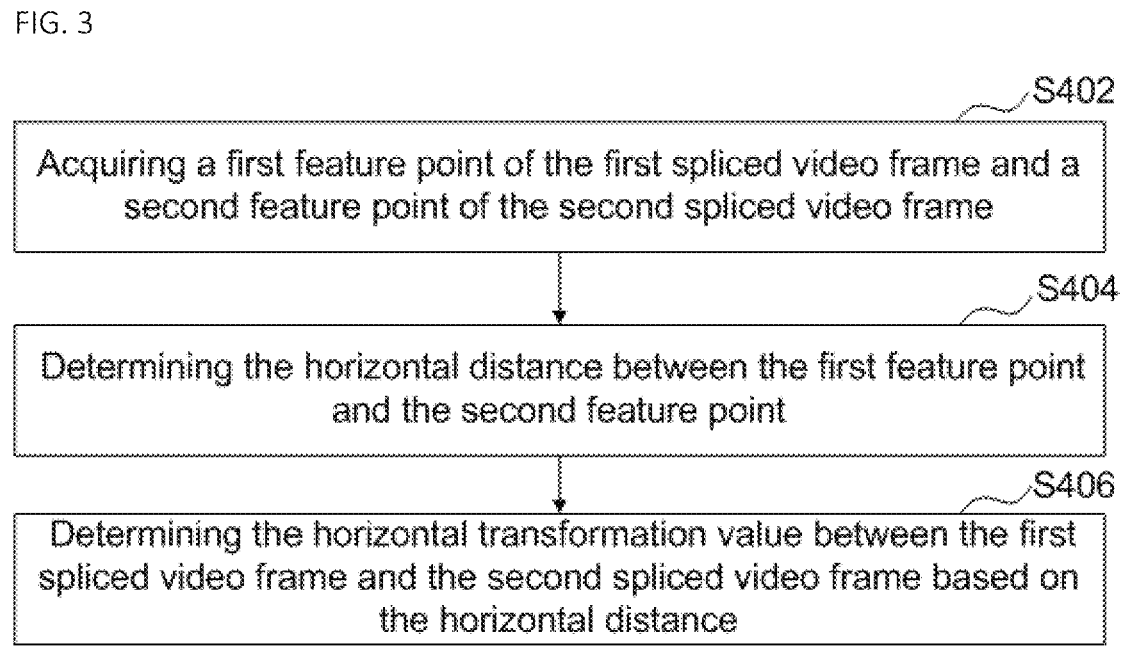
FIG. 4 is a schematic flowchart diagram of a video splicing method in another embodiment.

In one embodiment, as shown in FIG. 4, the spatial transformation relationship includes a horizontal transformation value, and the operation of determining a spatial transformation relationship between the first spliced video frame and the second spliced video frame and performing video frame alignment on the first video and the second video based on the spatial transformation relationship includes:

Step 402: acquiring a first feature point of the first spliced video frame and a second feature point of the second spliced video frame.

The feature point refers to a point that can reflect the essential feature in each video frame image, and a target object in the image can be identified through the essential feature. The distance between two video frames may be calculated by the distance of feature points in the two video frames.

Specifically, when the first video and the second video are anti-shake panoramic videos, the spatial transformation relationship between the first video and the second video only has horizontal transformation values. The anti-shake panoramic video refers to a video obtained after performing anti-shake processing on the panoramic video through video data recorded by inertial sensors and accelerometers or the like; the horizon in the anti-shake video is basically kept at the horizontal midline position of the panoramic video frame, and the pitch angle and roll angle between the anti-shake panoramic video frames shot for the same position at different times are basically zero. As shall be appreciated, the anti-shake panoramic video means that there is only one heading angle between anti-shake video images shot for the same position at different times, i.e., there is only horizontal translation.

In one embodiment, the first feature point of the first spliced video frame and the second feature point of the second spliced video frame may be directly extracted by the ORB feature point detection method or the SIFT feature point detection method.

In one embodiment, the panorama corresponding to the panoramic video may be first converted into a plane view, and then the first feature point of the first spliced video frame and the second feature point of the second spliced video frame may be extracted by using the ORB feature point detection method. The plane view may refer to a plane graph with a view angle of 90 degrees seen in a certain direction of the panorama; for example, the panorama includes six planes, namely, up, down, front, back, left and right planes, and each of the planes is a plane view. For example, the plane view includes a top view, a bottom view, a left view, a right view, an upward view and a downward view.

In one embodiment, the feature points may be extracted after the panorama corresponding to the panoramic video is converted into the downward view, and image transformation is performed on the panorama by the rotation matrix so as to obtain the image transformation from the panoramic image to the downward view image. The panorama refers to the image of which the viewing angle covers ±180 degrees of the horizon and ±90 degrees of the vertical direction respectively; if the panorama is regarded as an image in the spatial state of a cube, then the image may be considered as completely containing six plane views, namely, up, down, front, back, left and right views.

Step 404: determining the horizontal distance between the first feature point and the second feature point.

The horizontal distance refers to the difference between the horizontal coordinate of the first feature point and the horizontal coordinate of the second feature point. For example, if the horizontal distance between the first feature point and the second feature point is indicated as Δx, the horizontal coordinate of the first feature point is indicated as $x_{p1}$, and the horizontal coordinate of the second feature point is indicated as $x_{p2}$, then the horizontal distance Δx between the first feature point and the second feature point may be calculated by the following formula:

$$\Delta x = x_{p1} - x_{p2}$$

Specifically, after obtaining the first feature point of the first spliced video frame and the second feature point of the second spliced video frame, the horizontal distance between the first feature point of the first spliced video frame and the second feature point of the second spliced video frame is calculated.

Step 406: determining the horizontal transformation value between the first spliced video frame and the second spliced video frame based on the horizontal distance.

The horizontal transformation value refers to the horizontal difference between the first spliced video frame and the second spliced video frame obtained by using the horizontal distance.

Specifically, different horizontal transformation values can be obtained according to different ranges of values of the horizontal distance.

In one embodiment, according to the positive correlation between the horizontal transformation value and the horizontal distance, the horizontal transformation value is obtained by using different horizontal distances. If dx represents the horizontal transformation value and w represents the width of the panoramic video frame, then the horizontal transformation value dx may be expressed by the following formula:

$$dx = \begin{cases} x_{P_1} - x_{P_2} + \dfrac{W}{2}, & x_{P_1} - x_{P_2} < -\dfrac{W}{2} \\ x_{P_1} - x_{P_2}, & -\dfrac{W}{2} \le x_{P_1} - x_{P_2} \le \dfrac{W}{2} \\ x_{P_1} - x_{P_2} - \dfrac{W}{2}, & x_{P_1} - x_{P_2} > \dfrac{W}{2} \end{cases}$$

In one embodiment, the horizontal transformation value between the first spliced video frame and the second spliced video frame may be obtained by using the statistical value of the horizontal transformation values. For example, an average of the horizontal transformation values may be taken as the horizontal transformation value between the first spliced video frame and the second spliced video frame.

In one embodiment, the statistical value of the horizontal transformation value is obtained by sorting the obtained horizontal transformation values, the horizontal transformation values may be sorted in a descending order or in an ascending order, and the horizontal transformation value located in the middle of the sequence is taken as the statistical value of the horizontal transformation value. The statistical value of the horizontal transformation value may also be obtained by other methods. For example, the statistical value of the horizontal transformation value is obtained by calculating the average value, the weighted average value or the mode of the horizontal transformation values.

In this embodiment, the horizontal distance between the first feature point and the second feature point is obtained by acquiring the first feature point of the first spliced video frame and the second feature point of the second spliced video frame, and the horizontal transformation value between the first spliced video frame and the second spliced video frame is determined by the horizontal distance, so that the purpose of accurately determining the spatial transformation relationship between the first spliced video frame and the second spliced video frame can be achieved, thereby further improving the video splicing effect according to the accurate spatial transformation relationship.

Figure 5:
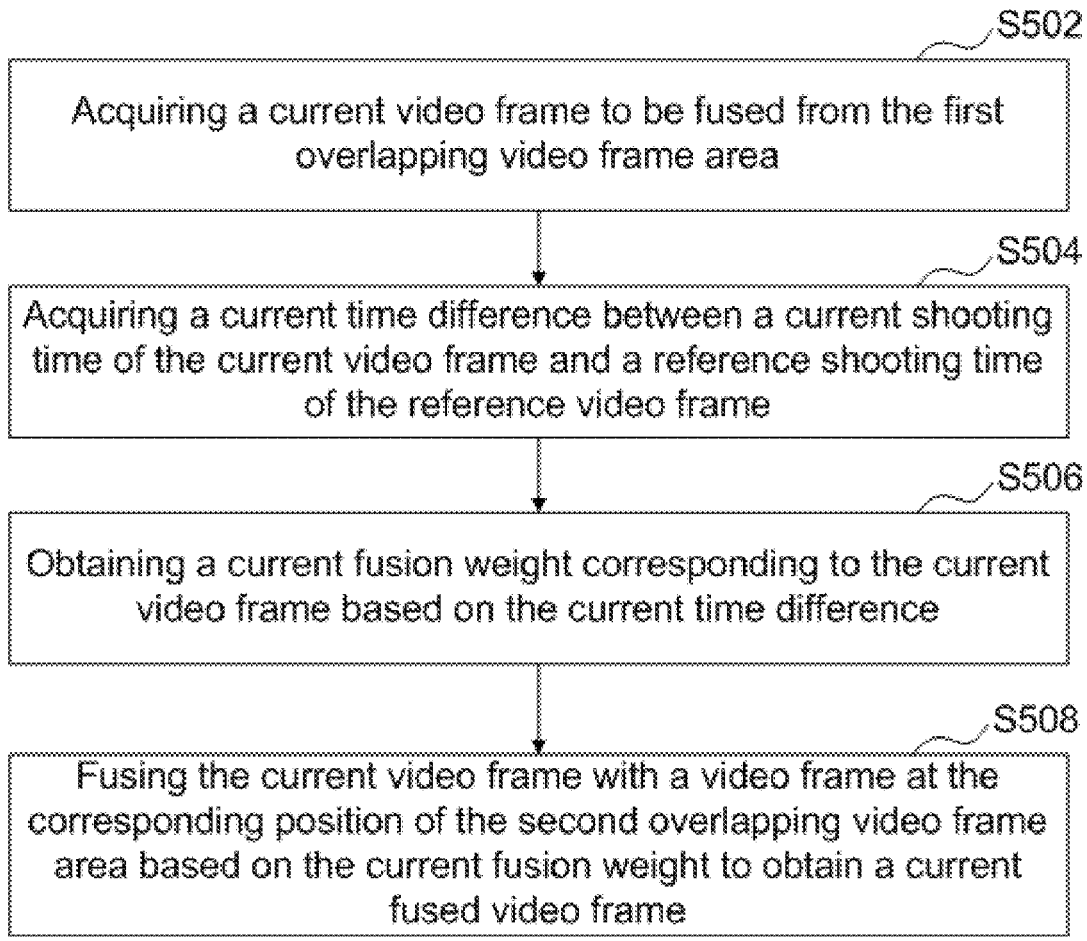
FIG. 5 is a schematic flowchart diagram for the operation of fusing a first overlapping video frame area and a second overlapping video frame area to obtain a fused video frame in one embodiment.

In one embodiment, as shown in FIG. 5, the operation of fusing the first overlapping video frame area and the second overlapping video frame area to obtain a fused video frame includes:

Step 502: acquiring a current video frame to be fused from the first overlapping video frame area.

Specifically, before fusing the first video and the second video in the overlapping video frame area, it is necessary to first acquire the current video frame to be fused in the overlapping video frame area.

In one embodiment, reading the video through the OpenCV software library and extracting each frame in the video may be realized by using the video acquisition structure function in the OpenCV software library. For example, a video is acquired by using the video acquisition structure functions 'VideoCapture' and 'Mat', and the current video frame to be fused may be further acquired by using the above-mentioned video acquisition structure functions. For example, filename represents a video file, frame represents a certain video frame that needs to be acquired, and grabbing and returning a video frame from a webcam or a file by using the above-mentioned video acquisition structure function may be expressed as:

VideoCapture cap("filename");
Mat frame;
cap >>frame;

Step 504: acquiring a current time difference between a current shooting time of the current video frame and a reference shooting time of the reference video frame.

Specifically, after acquiring the current video frame to be fused in the first overlapping video frame area in the first video, the current time difference may be obtained through the shooting time of the current video frame and the shooting time of the reference video frame since the current video frame will have a corresponding shooting time and similarly the reference video frame will also have a corresponding shooting time because of the different shooting time.

In one embodiment, the shooting time may be represented by a time stamp, the time stamp may be represented by the number of frames or represented by multiplying the number of frames by the frame rate, and both representations can uniquely determine the shooting time corresponding to a video frame. For example, in the case where the time stamp is expressed by the number of frames, the time stamp of the 100th frame of image in the video is 100; in the case where the time stamp is expressed by multiplying the number of frames by the frame rate, if the video frame rate is 30 frames per second, then the time stamp may also be 100/30=3.33 seconds. The current time difference is obtained according to the difference between the timestamp of the current video frame and the timestamp of the reference video frame.

In one embodiment, the current time difference may be obtained by the difference between the current shooting time of the current video frame and the reference shooting time of the reference video frame. If t1 represents the current shooting time of the current video frame, t2 represents the reference shooting time of the reference video frame, and Δt represents the current time difference between the current shooting time of the current video frame and the reference shooting time of the reference video frame, then the current time difference $\Delta t$ may be expressed by the formula: $\Delta t = t1 - t2$.

Step 506: obtaining a current fusion weight corresponding to the current video frame based on the current time difference, wherein the current time difference has a positive correlation with the current fusion weight.

The fusion weight refers to the proportion of the current video frame in the process of image fusion. Positive correlation means that the current fusion weight and the current time difference increase or decrease in the same trend; if the current time difference increases, then the current fusion weight increases accordingly; and if the current time difference decreases, then the current fusion weight decreases accordingly.

Specifically, after acquiring the current time difference, the current fusion weight may be obtained according to the positive correlation between the current time difference and the current fusion weight.

In one embodiment, in the process of weighted fusion of the first video and the second video, the weight may be determined by the current time difference between the current shooting time of the current video frame and the reference shooting time of the reference video frame in the overlapping area; if Q represents the weight, t1 represents the current shooting time of the current video frame, t2 represents the reference shooting time of the reference video frame, and t represents the total time corresponding to the video frames in the overlapping area, then the weight may be calculated by the difference between the current shooting time of the current video frame and the reference shooting time of the reference video frame as well as the total time corresponding to the video frames in the overlapping area; the weight Q may be expressed by the formula: $Q=(t1-t2)/t$, the weight Q increases as the current time difference $t1-t2$ increases; similarly, the weight Q decreases as the current time difference $t1-t2$ decreases.

Step 508: fusing the current video frame with a video frame at the corresponding position of the second overlapping video frame area based on the current fusion weight to obtain a current fused video frame.

Specifically, after the current fusion weight is obtained in the overlapping area, the first video and the second video are fused by using the current fusion weight so as to obtain a spliced video of higher quality.

In one embodiment, a fused spliced video is obtained by performing image fusion using the current fusion weight, the video frames in the first overlapping video frame area of the first video and the video frames in the second overlapping video frame area of the second video; if I represents the fused video frame, I1 represents the current video frame of the first video in the overlapping area, and I2 represents the current video frame of the second video in the overlapping area, then the fused video frame I may be expressed by the formula: $I=I1 \times Q+I2 \times (1-Q)$. As shall be appreciated, the first overlapping video frame area and the second overlapping video frame area are respectively areas of the overlapping video frame areas in the first video and the second video, and the areas are the overlapping areas of the first video and the second video, and the first overlapping video frame area and the second overlapping video frame area are used to distinguish whether the overlapping area presents in the areas corresponding to the first video or the second video.

In this embodiment, the current time difference is obtained, the current fusion weight is obtained through the current time difference, and the current video frame and the video frame at the corresponding position of the second overlapping video frame area are fused based on the current fusion weight to obtain the current fused video frame, so that the purpose of obtaining a complete video with a natural transition effect can be achieved.

Figure 6:
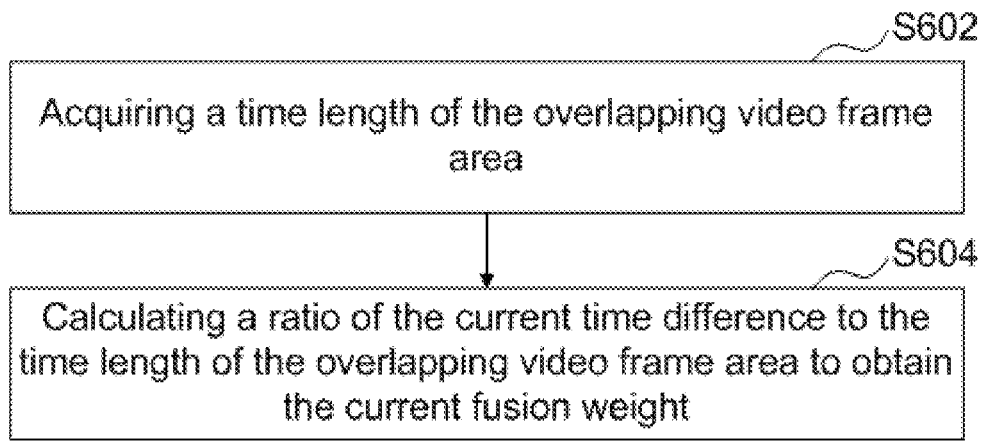
FIG. 6 is a schematic flowchart diagram for the operation of obtaining a current fusion weight corresponding to the current video frame based on the current time difference in one embodiment.

In one embodiment, as shown in FIG. 6, the operation of obtaining a current fusion weight corresponding to the current video frame based on the current time difference includes:

Step 602: acquiring a time length of the overlapping video frame area.

The time length of the overlapping video frame area refers to the video time length corresponding to the video frame of the overlapping area. For example, if the video length of the overlapping area is 600 milliseconds, then the time length of the overlapping video frame area is 600 milliseconds.

Specifically, one of parameters in the calculation of the current fusion weight is the time length of the overlapping video frame area, and one of the parameters for calculating the current fusion weight may be determined by acquiring the time length of the overlapping video frame area.

In one embodiment, through the total number of frames in the overlapping area and the video frame rate, the time length of the overlapping video frame area may be acquired according to the functional relationship between the total number of frames and the video frame rate. For example, b represents the total number of frames in the overlapping area, v represents the frame rate, and t represents the time length of the overlapping video frame area, then the time length t of overlapping area may be expressed by the formula: $t=b/v$.

Step 604: calculating a ratio of the current time difference to the time length of the overlapping video frame area to obtain the current fusion weight.

Specifically, $t1-t2$ represents the current time difference, t represents the time length of the overlapping video frame area, and Q represents the current fusion weight, then the current fusion weight Q may be expressed by the formula: $Q=(t1-t2)/t$.

In this embodiment, the purpose of accurately obtaining the current fusion weight can be achieved through the ratio of the current time difference to the time length of the overlapping video frame area, so that when the first video and the second video are spliced through the overlapping area, the video frames in the overlapping area can be fused by using the current fusion weight, thereby improving the video splicing effect.

Figure 7:
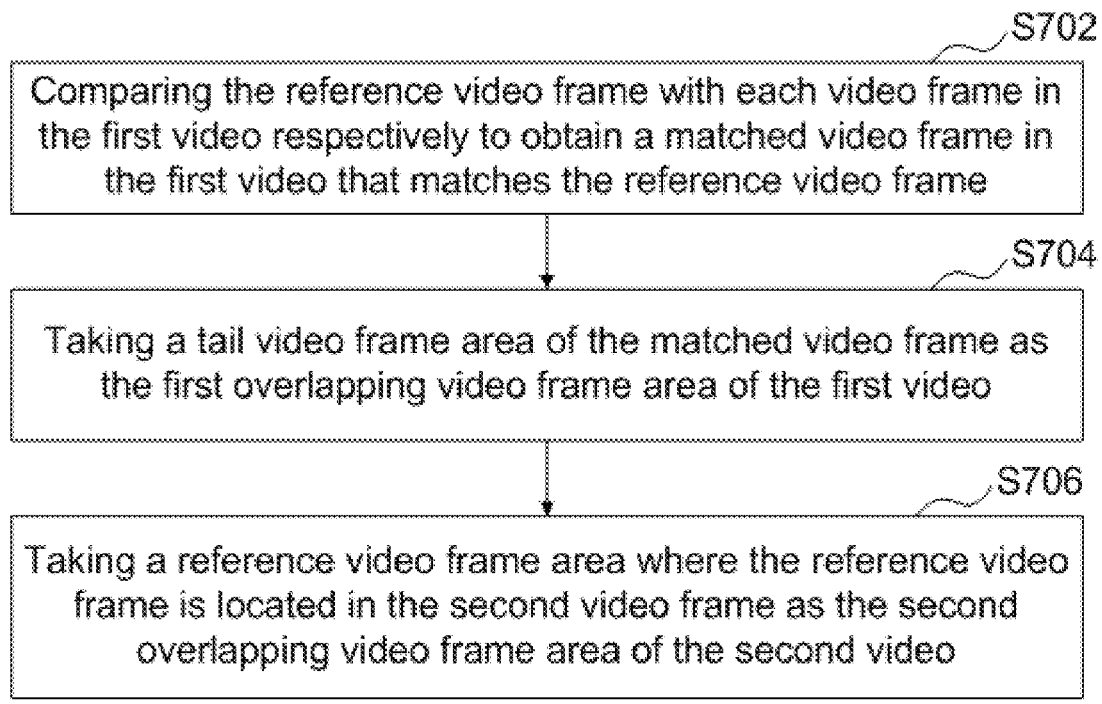
FIG. 7 is a schematic flowchart diagram of a video splicing method in another embodiment.

In one embodiment, as shown in FIG. 7, the operation of searching for an overlapping area on the basis of the reference video frame so as to obtain a first overlapping video frame area of the first video and a second overlapping video frame area of the second video includes:

Step 702: comparing the reference video frame with respective video frames in the first video respectively to obtain a matched video frame in the first video that matches the reference video frame.

The matched video frame refers to a video frame in the first video that can meet the matching condition with the reference video frame. For example, among the video frames in the first video, the video frame with the largest number of matching points with the reference video frame may be regarded as the matched video frame.

Specifically, the reference video frame is a backward video frame of a freeze frame in the second video, and in order to avoid video quality problems such as the video being unsmooth or still, the reference video frame is considered as the first non-freeze frame, and the reference video frame is selected as the video frame to be compared to obtain the matched video frame.

In one embodiment, among the video frames in the first video, the video frame with the highest matching rate with the video frame serving as the reference video frame in the second video is selected as the matched video frame. The matching rate may be the ratio of the matching number of feature points to the total number of feature points. For example, if the matching number of feature points between the reference video frame and a certain video frame in the first video is 1000 and the total number of feature points is 1500, then the matching rate is the ratio of 1000 to 1500, i.e., 67%.

Step 704: taking a tail video frame area of the matched video frame as the first overlapping video frame area of the first video.

The tail video frame area refers to the corresponding video frame area from the beginning of the matched video frame to the video frame at the end of the first video. For example, if the matched video frame is P, then the tail video frame area is the video frames after the frame P in the first video.

Specifically, after the matched video frame is acquired, the video frames after the matched video frame may be obtained in the first video to serve as the first overlapping video frame area of the first video.

Step 706: taking a reference video frame area where the reference video frame is located in the second video frame as the second overlapping video frame area of the second video, wherein the reference video frame is a head video frame of the reference video frame area, and the number of video frames in the reference video frame area matches that in the tail video frame area.

The head video frame refers to the first video frame in the video frame area.

Specifically, there are both video frames of the first video and video frames of the second video in the overlapping area, and in order to achieve the alignment and fusion of video frames in the overlapping area, the number of video frames in the overlapping area needs to be the same. The reference video frame area is located in the second overlapping video frame area in the second video, while the tail video frame area is located in the first overlapping video frame area in the first video, and there are the same number of video frames in the two overlapping video frame areas. As shall be appreciated, the first overlapping video frame area and the second overlapping video frame area will form an overlapping video frame area after video fusion, the video frame before the overlapping video frame area is the video frame of the first video and the video frame after the overlapping video frame area is the video frame of the second video.

In this embodiment, the matched video frame may be obtained by the reference video frame, the first overlapping video frame area is obtained by the matched video frame, and the second overlapping video frame area is obtained on the second video correspondingly, so that the purpose of accurately determining the overlapping video frame area can be achieved, and thus video fusion is performed on the overlapping video frame area, and natural splicing of the first video and the second video is realized in the overlapping video frame area.

Figure 8:
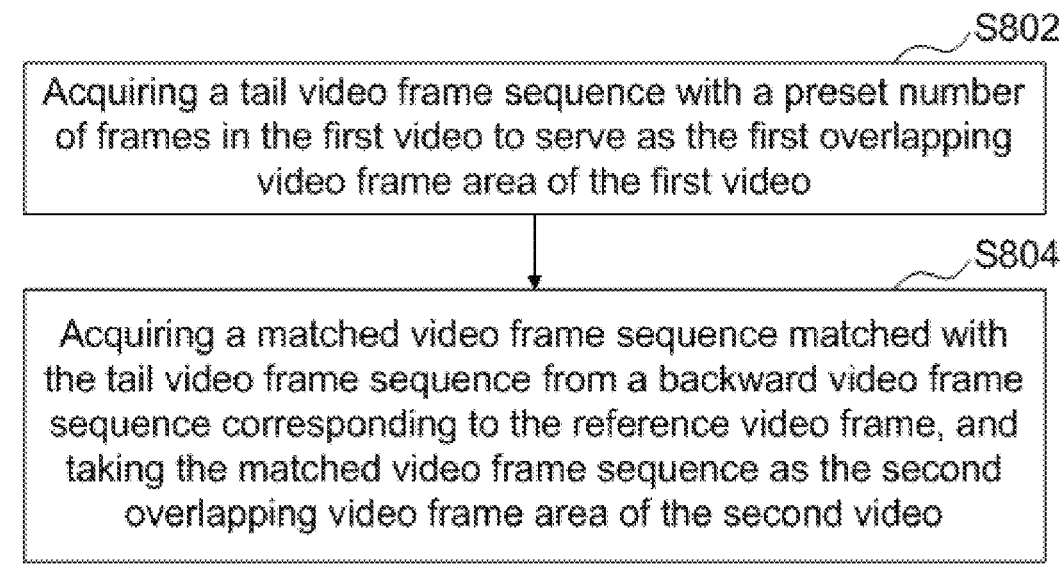
FIG. 8 is a schematic flowchart diagram of a video splicing method in another embodiment.

In one embodiment, as shown in FIG. 8, the operation of searching for an overlapping area on the basis of the reference video frame so as to obtain a first overlapping video frame area of the first video and a second overlapping video frame area of the second video includes:

Step 802: acquiring a tail video frame sequence with a preset number of frames in the first video to serve as the first overlapping video frame area of the first video.

The preset number of frames refers to the predetermined number of video frames. The number of video frames in the obtained tail video frame sequence may be determined by the predetermined number of video frames. For example, if the preset number of frames is m, then the obtained tail video frame sequence contains m video frames.

Specifically, before determining the first overlapping video frame area, the preset number of frames may be determined by continuous trial and error in the way of pre-judgment.

In one embodiment, the video frame area corresponding to a plurality of preset numbers of frames may be set as the first overlapping video frame area of the first video according to the empirical value with the total number of frames of the video as a reference.

Step 804: acquiring a matched video frame sequence matched with the tail video frame sequence from a backward video frame sequence corresponding to the reference video frame, and taking the matched video frame sequence as the second overlapping video frame area of the second video.

The backward video frame sequence refers to the sequence consisting of video frames after the reference video frame. The sequence may include a part of the video frames after the reference video frame or include all the video frames after the reference video frame.

Specifically, after obtaining the tail video frame sequence serving as the first overlapping video frame area, it is necessary to find the corresponding video frame sequence in the second video, which has the same number of video frames as the first overlapping video frame area and meets certain matching conditions, to serve as the second overlapping video frame area.

In one embodiment, a preset number of video frames after the reference video frame may be taken as a matched video frame sequence. For example, m frames after the reference video frame may be taken and compared with the last m frames in the first video to obtain m frames corresponding to the maximum statistical value of the matching number of feature points to serve as the overlapping area. When m takes different values, the obtained statistical values of the matching number of feature points are different, a table of correspondence between the numerical value m and the statistical values of the matching number of feature points is formed, the maximum value of the statistical value of the matching number is found from the table, and m corresponding to the maximum value is the obtained number of video frames of the overlapping area.

TABLE 2

Table of Correspondence between Value of m and Statistical Value of Matching Number of Feature Points

| Value of m (preset number of frames) | Statistical value of matching number of feature points |
|---|---|
| 20 | 1000 |
| 30 | 1200 |
| 35 | 900 |
| 40 | 1100 |

As can be found from Table 2, when the value of m is 30, the corresponding statistical value of the matching number of feature points is the largest, and then the last 30 frames in the first video are regarded as the overlapping area.

In this embodiment, the first overlapping video frame area is obtained by acquiring the tail video frame sequence with a preset number of frames in the first video, and a matched video frame sequence matched with the tail video frame sequence is acquired through the video frames in the obtained first overlapping video frame area, and the matched video frame sequence is taken as the second overlapping video frame area of the second video, so that the purpose of accurately determining the overlapping video frame area can be achieved; in this way, the splicing of the first video and the second video is completed in the overlapping video frame area, thereby realizing natural transition during the splicing of the first video and the second video and improving the effect of video splicing.

In one embodiment, the operation of performing frame freeze detection on the first video or the second video to obtain a freeze frame sequence includes:

Converting the first video or the second video into a plane video.

The plane video is a video composed of various plane view images. The plane view image may refer to a plane graph with a view angle of 90 degrees seen in a certain direction of the panorama; for example, the panorama includes six planes, namely, up, down, front, back, left and right planes, and each of the planes is a plane view. For example, the plane view includes a top view, a bottom view, a left view, a right view, an upward view and a downward view.

In one embodiment, the feature points may be extracted after the panorama corresponding to the panoramic video is converted into the downward view in the plane view corresponding to the plane video, and image transformation is performed on the panorama by the rotation matrix to obtain the image transformation from the panoramic image to the downward view image. The panorama refers to the image of which the viewing angle covers ±180 degrees of the horizon and ±90 degrees of the vertical direction respectively; if the panorama is regarded as an image in the spatial state of a cube, then the image may be considered as completely containing six plane views, namely, up, down, front, back, left and right views.

Frame freeze detection is performed on the plane video to obtain a freeze frame sequence.

In one embodiment, a first plane video and a second plane video may be acquired respectively, and feature points are extracted and matched between the last video frame in the first plane video and a plurality of consecutive video frames before the last video frame in sequence. When the matching results of the feature points of the plurality of consecutive video frames before the last video frame all meet the threshold condition, the video frame sequence consisting of the plurality of video frames is determined as a freeze frame sequence. For example, the last plane video frame in the first plane video is indicated as the first frame, and the feature points are extracted and matched between the last plane video frame and the consecutive n-2 frames before the last video frame; and when the matching results all meet the threshold condition, the video frame sequence consisting of the last n-1 frames in the first video is determined as a freeze frame sequence.

In one embodiment, feature points may be extracted and matched between the first plane video frame in the second plane video and a plurality of consecutive video frames after the first video frame in sequence. When the matching results of the feature points of the plurality of consecutive video frames after the first video frame all meet the threshold condition, the video frame sequence consisting of the plurality of video frames is determined as a freeze frame sequence. For example, the first video frame in the second plane video is indicated as the first frame, and the feature points are extracted and matched between the first video frame and the consecutive n-2 frames after the first video frame; and when the matching results all meet the threshold condition, the video frame sequence consisting of the first n-1 frames in the second plane video is determined as a freeze frame sequence.

Figure 9:
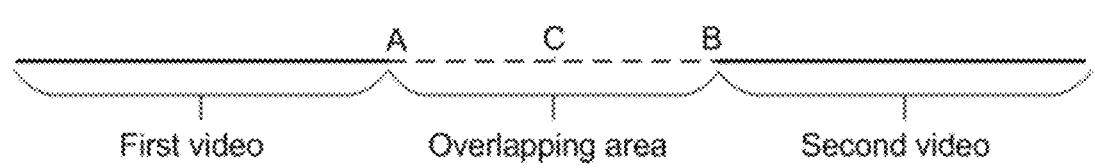
FIG. 9 is a schematic view of a method for determining a position of the spliced video frame in one embodiment.

In one embodiment, as shown in FIG. 9, in the process of video acquisition, the camera is first placed at a certain position though which the camera passes when the end video in a first video (a previous piece of video) is shot, and then the camera remains still for a period of time, and then the camera is moved along the motion path in which the end video in the first video is shot to start the shooting of a second video (a second piece of video). Both the first video and the second video have the overlapping areas where the end video was shot, and it is assumed that the video frame where the movement starts in the second video is at the frame A and the ending position of the overlapping area is at the frame B. The range of the overlapping area is also from the frame A to the frame B among the video frames in the first video. The video frame in the central position between the frame A and the frame B may be taken as the position of the spliced video frame, or other video frames between the frame A and the frame B may be taken as the position of the spliced video frame, and the splicing of the first video and the second video is completed by using the position of the spliced video frame. It is assumed that the position of the spliced video frame is indicated as a frame C, video frames at multiple video frames after the frame A may be taken as the frame C, and for example, video frames at five video frames after the frame A may be taken as the frame C.

In one embodiment, a panoramic video shot by an anti-shake camera for an object passing through an obstacle is taken as an example for illustration. When an object is photographed passing through an obstacle, the shooting of a first piece of video (a first video) is stopped after the object passes through the obstacle for a certain distance. Then, the camera bypasses the obstacle and shoots a second piece of video (a second video) of the object passing through the obstacle from the other side of the obstacle, the shooting of the second piece of video starts from the place where the object passed through the obstacle photographed in the first video; because there is a certain time delay in shooting, the second piece of video photographed looks still at the beginning. Then, the second piece of video continues to be shot along the route of passing through the obstacles photographed in the first video, so that the two pieces of videos shot sequentially have a same shooting route, that is, an overlapping path which is used to connect the two pieces of videos shot sequentially. For panoramic videos shot by the anti-shake camera, in the case where the shooting positions are generally the same, there is only a simple transformation relationship between two pieces of videos shot sequentially, and the transformation relationship is a horizontal translation relationship; the first piece of video or the second piece of video is moved by using the horizontal translation relationship, so that the first piece of video and the second piece of video are aligned in the overlapping path, and the fusion of video frame images is completed by using the image fusion method so that natural transition is realized for the first piece of video and the second piece of video, thereby realizing seamless connection between the first piece of video and the second piece of video. In one embodiment, a server is provided, and the server is used for executing the steps in the embodiments of the methods described above. The server may be realized by an independent server or a server cluster composed of multiple servers.

As shall be appreciated, although the steps in the flowchart diagrams of FIG. 2 to FIG. 8 are displayed in sequence as indicated by arrows, these steps are not necessarily executed in sequence as indicated by the arrows. Unless explicitly stated herein, the execution of these steps is not strictly limited in order, and these steps may be executed in other orders. Moreover, at least some of the steps in FIG. 2 to FIG. 8 may include multiple steps or multiple stages, these steps or stages are not necessarily executed at the same time but may be executed at different times, and these steps or stages are not necessarily executed sequentially but may be alternately or alternatively executed with other steps or at least some of the steps or stages in other steps.

Figure 10:
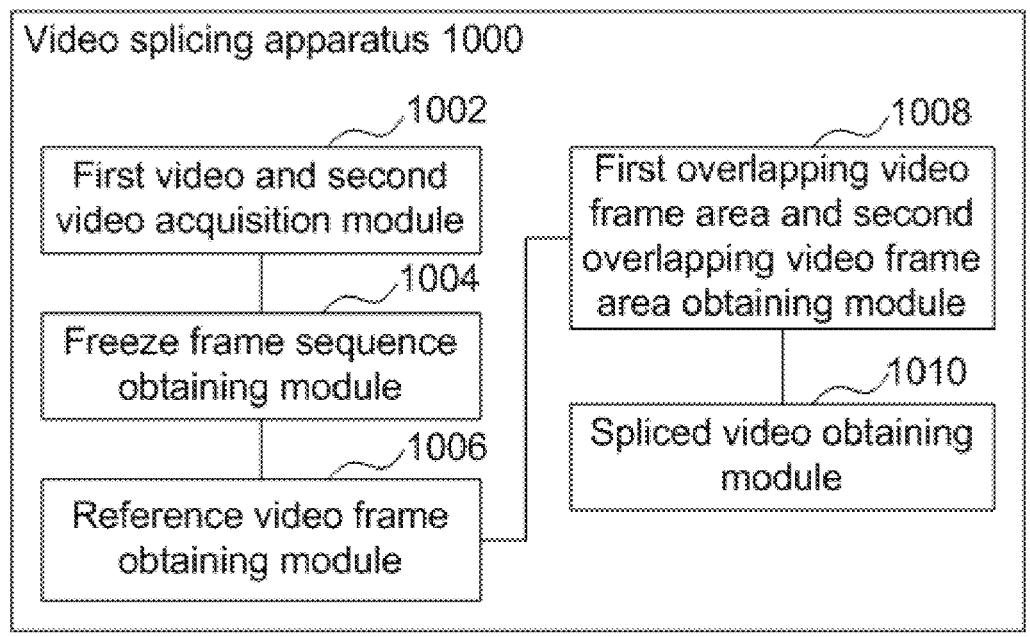
FIG. 10 is a structural block diagram of a video splicing apparatus in one embodiment.

In one embodiment, as shown in FIG. 10, a video splicing apparatus 1000 is provided, which includes a first video and second video acquisition module 1002, a freeze frame sequence obtaining module 1004, a reference video frame obtaining module 1006, a first overlapping video frame area and second overlapping video frame area obtaining module 1008 and a spliced video obtaining module 1010, wherein the first video and second video acquisition module 1002 is configured to acquire a first video and a second video which are to be spliced, and the first video is before the second video; the freeze frame sequence obtaining module 1004 is configured to perform frame freeze detection on the first video or the second video so as to obtain a freeze frame sequence; the reference video frame obtaining module 1006 is configured to obtain a reference video frame on the basis of the freeze frame sequence; the first overlapping video frame area and second overlapping video frame area obtaining module 1008 is configured to search for an overlapping area on the basis of the reference video frame so as to obtain a first overlapping video frame area of the first video and a second overlapping video frame area of the second video; the spliced video obtaining module 1010 is configured to splice the first video and the second video on the basis of the first overlapping video frame area and the second overlapping video frame area so as to obtain a spliced video.

In one embodiment, the spliced video obtaining module 1010 is configured to acquire a position of the spliced video frame, acquire a first spliced video frame corresponding to the position of the spliced video frame from the first overlapping video frame area, and acquire a second spliced video frame corresponding to the position of the spliced video frame from the second overlapping video frame area; determine a spatial transformation relationship between the first spliced video frame and the second spliced video frame, and perform video frame alignment on the first video and the second video based on the spatial transformation relationship; perform video frame splicing based on the aligned first video frame and second video frame to obtain a spliced video, wherein during splicing, the first overlapping video frame area and the second overlapping video frame area are fused to obtain a fused video frame.

In one embodiment, the spliced video obtaining module 1010 is configured to: acquire a first feature point of the first spliced video frame and a second feature point of the second spliced video frame; determine a horizontal distance between the first feature point and the second feature point; determine a horizontal transformation value between the first spliced video frame and the second spliced video frame based on the horizontal distance.

In one embodiment, the spliced video obtaining module 1010 is configured to: acquire a current video frame to be fused from the first overlapping video frame area; acquire a current time difference between a current shooting time of the current video frame and a reference shooting time of the reference video frame; obtain a current fusion weight corresponding to the current video frame based on the current time difference, wherein the current time difference has a positive correlation with the current fusion weight; fuse the current video frame with a video frame at the corresponding position of the second overlapping video frame area based on the current fusion weight to obtain a current fused video frame.

In one embodiment, the spliced video obtaining module 1010 is configured to: acquire a time length of the overlapping video frame area; calculate a ratio of the current time difference to the time length of the overlapping video frame area to obtain the current fusion weight.

In one embodiment, the first overlapping video frame area and second overlapping video frame area obtaining module 1008 is configured to: compare the reference video frame with respective video frames in the first video respectively to obtain a matched video frame in the first video that matches the reference video frame; take a tail video frame area of the matched video frame as the first overlapping video frame area of the first video; take a reference video frame area where the reference video frame is located in the second video frame as the second overlapping video frame area of the second video, wherein the reference video frame is a head video frame of the reference video frame area, and the number of video frames in the reference video frame area matches that in the tail video frame area.

In one embodiment, the first overlapping video frame area and second overlapping video frame area obtaining module 1008 is configured to: acquire a tail video frame sequence with a preset number of frames in the first video to serve as the first overlapping video frame area of the first video; acquire a matched video frame sequence matched with the tail video frame sequence from a backward video frame sequence corresponding to the reference video frame, and take the matched video frame sequence as the second overlapping video frame area of the second video.

In one embodiment, the freeze frame sequence obtaining module 1004 is configured to: convert the first video or the second video into a plane video; perform frame freeze detection on the plane video so as to obtain the freeze frame sequence.

Reference may be made to the limitation to the video splicing method described above for specific limitation to the video splicing apparatus, and this will not be further described herein. Each module in the video splicing apparatus described above may be realized in whole or in part by software, hardware and combinations thereof. The above modules may be embedded in a processor in a computer device in the form of hardware or independent of the processor in the computer device, and these modules may also be stored in a memory in the computer device in the form of software so that they can be conveniently called by the processor to execute the operations corresponding to the above modules.

Figure 11:
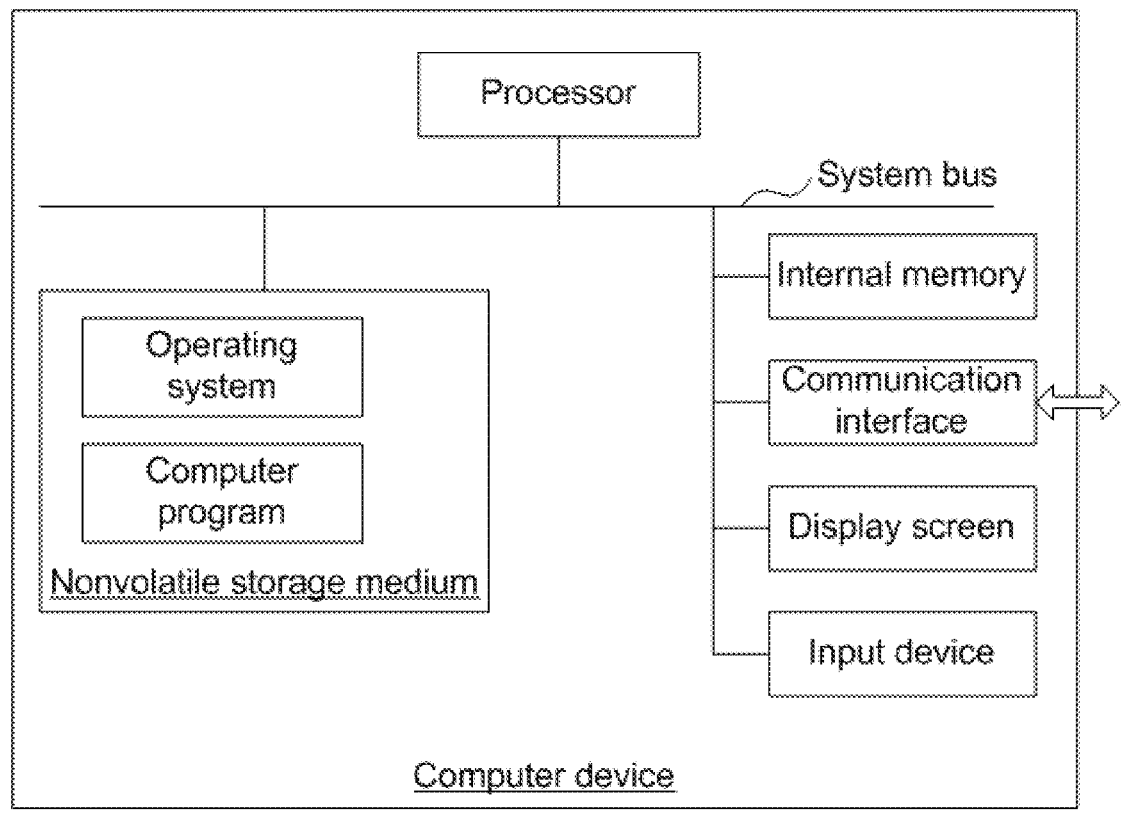
FIG. 11 is an internal structural diagram of a computer device in one embodiment.

In one embodiment, a computer device is provided, the computer device may be a terminal, and the internal structure diagram thereof may be as shown in FIG. 11. The computer device includes a processor, a memory, a communication interface, a display screen and an input device connected through a system bus. The processor of the computer device is used for providing computing and control capabilities. The memory of the computer device includes a non-volatile storage medium and an internal memory. The nonvolatile storage medium stores an operating system and a computer program. The internal memory provides an environment for the operation of the operating system and the computer programs in the nonvolatile storage medium. The communication interface of the computer device is used for wired or wireless communication with external terminals, and the wireless communication may be realized by WIFI, operator network, Near Field Communication (NFC) or other technologies. The computer program, when executed by a processor, implements a video splicing method. The display screen of the computer device may be a liquid crystal display screen or an electronic ink display screen, and the input device of the computer device may be a touch layer covered on the display screen, or a button, a trackball or a touchpad arranged on the shell of the computer device, or an externally connected keyboard, a touchpad or a mouse or the like.

As shall be appreciated by those skilled in the art, the structure shown in FIG. 11 is only a block diagram of a part of the structure related to the scheme of the present application, and it does not constitute a limitation on the computer device to which the scheme of the present application is applied, and a specific computer device may include more or less components than those shown in the figure, or include combinations of some components or different component arrangements.

In an embodiment, a computer device is further provided, the computer device includes a memory and a processor, a computer program is stored in the memory, and the processor implements the steps in the embodiments of the above-mentioned methods when executing the computer program.

In one embodiment, a computer-readable storage medium is provided on which a computer program is stored, and the computer program, when executed by a processor, implements the steps in the embodiments of the above-mentioned methods.

As shall be appreciated by those of ordinary skill in the art, all or part of the processes in the embodiments of the above-mentioned method may be realized by instructing related hardware through a computer program, the computer program may be stored in a nonvolatile computer-readable storage medium, and the computer program, when being executed, may include the processes in the embodiments of the above-mentioned methods. Any reference to memory, storage, database or other media used in the embodiments provided by the present application may include at least one of non-volatile and volatile memories. The non-volatile memory may include a Read-Only Memory (ROM), a magnetic tape, a floppy disk, a flash memory or an optical memory or the like. The volatile memory may include a Random Access Memory (RAM) or an external cache. By way of illustration but not limitation, RAM may be in various forms, such as a Static Random Access Memory (SRAM) or Dynamic Random Access Memory (DRAM) or the like.

The technical features of the above embodiments may be combined arbitrarily, and in order to make the description concise, not all possible combinations of the technical features in the above embodiments are described; however, the combinations of these technical features shall be considered as within the scope recorded in this specification as long as there is no contradiction therebetween.

The above-mentioned embodiments only express several implementations of the present application which are described specifically and in detail, but these implementations should not be construed as limitation to the scope of patent of the present invention. It shall be noted that for those of ordinary skill in the art, several modifications and improvements may be made without departing from the concept of the present application, and all these modifications and improvements are within the scope claimed in the present application. Therefore, the scope claimed in the patent of the present application shall be governed by the appended claims.

The invention claimed is:

1. A video splicing method, comprising:
    acquiring a first video and a second video which are to be spliced, wherein the first video is before the second video;
    performing frame freeze detection on the first video or the second video so as to obtain a freeze frame sequence;
    obtaining a reference video frame on the basis of the freeze frame sequence;
    searching for an overlapping area on the basis of the reference video frame so as to obtain a first overlapping video frame area of the first video and a second overlapping video frame area of the second video; and
    splicing the first video and the second video on the basis of the first overlapping video frame area and the second overlapping video frame area to obtain a spliced video,
    wherein the operation of performing frame freeze detection on the first video or the second video so as to obtain a freeze frame sequence comprises:
    converting the first video or the second video into a plane video; and
    performing the frame freeze detection on the plane video so as to obtain the freeze frame sequence.

2. The method according to claim 1, wherein the operation of splicing the first video and the second video on the basis of the first overlapping video frame area and the second overlapping video frame area to obtain a spliced video comprises:
    acquiring a position of the spliced video frame;
    acquiring a first spliced video frame corresponding to the position of the spliced video frame from the first overlapping video frame area, and acquiring a second spliced video frame corresponding to the position of the spliced video frame from the second overlapping video frame area;
    determining a spatial transformation relationship between the first spliced video frame and the second spliced video frame, and performing video frame alignment on the first video and the second video based on the spatial transformation relationship; and
    performing video frame splicing based on the aligned first video frame and second video frame to obtain a spliced video, wherein the first overlapping video frame area and the second overlapping video frame area are fused to obtain a fused video frame during the video frame splicing.

3. The method according to claim 2, wherein the spatial transformation relationship comprises a horizontal transformation value, and the operation of determining a spatial transformation relationship between the first spliced video frame and the second spliced video frame and performing video frame alignment on the first video and the second video based on the spatial transformation relationship comprises:

acquiring a first feature point of the first spliced video frame and a second feature point of the second spliced video frame;

determining a horizontal distance between the first feature point and the second feature point; and determining a horizontal transformation value between the first spliced video frame and the second spliced video frame based on the horizontal distance.

4. The method according to claim 2, wherein the operation of fusing the first overlapping video frame area and the second overlapping video frame area to obtain a fused video frame comprises:

acquiring a current video frame to be fused from the first overlapping video frame area;

acquiring a current time difference between a current shooting time of the current video frame and a reference shooting time of the reference video frame;

obtaining a current fusion weight corresponding to the current video frame based on the current time difference, wherein the current time difference has a positive correlation with the current fusion weight; and fusing the current video frame with a video frame at the corresponding position of the second overlapping video frame area based on the current fusion weight to obtain a current fused video frame.

5. The method according to claim 4, wherein the operation of obtaining a current fusion weight corresponding to the current video frame based on the current time difference comprises:

acquiring a time length of the overlapping video frame area; and calculating a ratio of the current time difference to the time length of the overlapping video frame area to obtain the current fusion weight.

6. The method according to claim 1, wherein the operation of searching for an overlapping area on the basis of the reference video frame so as to obtain a first overlapping video frame area of the first video and a second overlapping video frame area of the second video comprises:

comparing the reference video frame with each video frame in the first video respectively to obtain a matched video frame in the first video that matches the reference video frame;

taking a tail video frame area of the matched video frame as the first overlapping video frame area of the first video; and taking a reference video frame area where the reference video frame is located in the second video frame as the second overlapping video frame area of the second video, wherein the reference video frame is a head video frame of the reference video frame area, and the number of video frames in the reference video frame area matches that in the tail video frame area.

7. The method according to claim 1, wherein the operation of searching for an overlapping area on the basis of the reference video frame so as to obtain a first overlapping video frame area of the first video and a second overlapping video frame area of the second video comprises:

acquiring a tail video frame sequence with a preset number of frames in the first video to serve as the first overlapping video frame area of the first video; and acquiring a matched video frame sequence matched with the tail video frame sequence from a backward video frame sequence corresponding to the reference video frame, and taking the matched video frame sequence as the second overlapping video frame area of the second video.

8. A computer device, comprising a memory and a processor, the memory storing a computer program, wherein the processor implements the steps of the video splicing method according to claim 1 when executing the computer program.

9. A computer-readable non-volatile storage medium storing a computer program thereon, wherein the computer program, when executed by a processor, implements the steps of the video splicing method according to claim 1.

10. A computer device, comprising a memory and a processor, the memory storing a computer program, wherein the processor implements the steps of the video splicing method according to claim 2 when executing the computer program.

11. A computer device, comprising a memory and a processor, the memory storing a computer program, wherein the processor implements the steps of the video splicing method according to claim 3 when executing the computer program.

12. A computer device, comprising a memory and a processor, the memory storing a computer program, wherein the processor implements the steps of the video splicing method according to claim 4 when executing the computer program.

13. A computer device, comprising a memory and a processor, the memory storing a computer program, wherein the processor implements the steps of the video splicing method according to claim 5 when executing the computer program.

14. A computer device, comprising a memory and a processor, the memory storing a computer program, wherein the processor implements the steps of the video splicing method according to claim 6 when executing the computer program.

15. A computer device, comprising a memory and a processor, the memory storing a computer program, wherein the processor implements the steps of the video splicing method according to claim 7 when executing the computer program.

* * * * *